US008280713B2

(12) United States Patent
Adir et al.

(10) Patent No.: US 8,280,713 B2
(45) Date of Patent: Oct. 2, 2012

(54) AUTOMATIC GENERATION OF TEST SUITE FOR PROCESSOR ARCHITECTURE COMPLIANCE

(75) Inventors: Allon Adir, Kiryat Tivon (IL); Sigal Asaf, Zichron Yaakov (IL); Laurent Fournier, Givat Ela (IL); Itai Jaeger, Lavon (IL)

(73) Assignee: International Business Machines Corporation, Armonk, NY (US)

( * ) Notice: Subject to any disclaimer, the term of this patent is extended or adjusted under 35 U.S.C. 154(b) by 1258 days.

(21) Appl. No.: 11/735,510

(22) Filed: Apr. 16, 2007

(65) Prior Publication Data
US 2008/0255822 A1 Oct. 16, 2008

(51) Int. Cl.
G06F 17/50 (2006.01)
G06F 9/455 (2006.01)

(52) U.S. Cl. .............. 703/14; 703/15; 703/16; 716/106

(58) Field of Classification Search .............. 703/21, 703/14–16; 716/106, 136; 706/14; 710/269; 714/33
See application file for complete search history.

(56) References Cited

U.S. PATENT DOCUMENTS

| 5,465,216 | A | * | 11/1995 | Rotem et al. ................ 716/103 |
| 5,724,504 | A | | 3/1998 | Aharon et al. |
| 7,007,251 | B2 | | 2/2006 | Hekmatpour |
| 2004/0078674 | A1 | | 4/2004 | Raimi et al. |

FOREIGN PATENT DOCUMENTS

| WO | WO2005055094 A2 | 6/2005 |
| WO | WO2006054265 A2 | 5/2006 |

OTHER PUBLICATIONS

Mayan Moudgill, Pradip Bose and Jaime H. Moreno, Feb. 1999, Validation of Turandot, a Fast Processor Model for Microarchitecture Exploration, IEEE International Performance, Computing and Communications Conference (IPCCC), pp. 1-7.*

Y. Lichenstein et al., "*Model-Based Test Generation for Process Design Verification*", Sixth Innovative Applications of Artificial Intelligence Conference, Aug. 1994, pp. 83-94.

Sharma, "Verifying an ARM Core", 2001 http://www.eetimes.com/isd/features/OEG20010228S0085.

A.K. Chandra et al., "Architectural verification of processors using symbolic instruction graphs", Proceedings—IEEE International Conference on Computer Design: VLSI in Computers and Processors, 1994, p. 454-459.

L-M Wu et al., "A BNF-based automatic test program generator for compatible microprocessor verification", ACM Transactions on Design Automation of Electronic Systems, vol. 9, No. 1, Jan. 2004, pp. 105-132.

A. Chandra et al, "AVPGEN—a test generator for architecture verification", IEEE Transactions on Very Large Scale Integration (VLSI) Systems, v 3, n 2, Jun. 1995, p. 188-200.

(Continued)

*Primary Examiner* — Mary C Jacob
*Assistant Examiner* — Aniss Chad

(57) ABSTRACT

A parametrically controlled model-based test generator automatically generates architectural compliance test suites for different implementations of a processor architecture, based on a set of architectural decisions chosen among optional behaviors for each implementation. Thus, different implementations of the same architecture can be easily supported by modifying the parameter values. In addition, ongoing changes to the architecture or comprehensive updates to the test suite can be easily handled by updating the architecture model or the coverage models, forgoing the need to review the whole, potentially huge, set of tests.

23 Claims, 2 Drawing Sheets

OTHER PUBLICATIONS

P. Mishra et al. "Automatic functional test program generation for pipelined processors using model checking", Proceedings Seventh IEEE International High-Level Design Validation and Test Workshop, 2002, 99-103.

L. Fournier et al., "Developing an architecture validation suite: application to the PowerPC architecture", Proceedings 1999 Design Automation Conference (Cat. No. 99CH36361), 1999, 189-94.

Yu Zhi-yi et al., "Automatic test program generation focusing pipeline hazard in processor verification", Mini-Micro Systems, v 25, n 7, Jul. 2004, 1212-15 Language: Chinese (Abstract only).

A. Adir et al., "Adaptive test program generation: planning for the unplanned", Proceedings Seventh IEEE International High-Level Design Validation and Test Workshop, 2002, 83-8.

Ali Y. Duale et al., "Architectural verification of large multiprocessor computers", Proceedings of the International Conference on Parallel and Distributed Processing Techniques and Applications, PDPTA'04, v 1, Proceedings of the International Conference on Parallel and Distributed Processing Techniques and Applications, PDPTA'04, 2004, p. 502-507.

P. Biswas et al., "Functional verification of the superscalar SH-4 microprocessor", Digest of Papers—COMPCON—IEEE Computer Society International Conference, 1997, p. 115-120.

\* cited by examiner

AUTOMATIC GENERATION OF TEST SUITE FOR PROCESSOR ARCHITECTURE COMPLIANCE

BACKGROUND OF THE INVENTION

1. Field of the Invention

This invention relates generally to design verification. More particularly, this invention relates to evaluation of a processor implementation for compliance with its specification.

2. Description of the Related Art

TABLE 1

Acronyms and Abbreviations

| | |
|---|---|
| ARM | Advanced RISC Machine |
| ASIC | Application-Specific Integrated Circuit |
| CPU | Central Processing Unit |
| CSP | Constraint Satisfaction Problem |
| DAG | Directed Acyclic Graph |
| I/O | Input/Output |
| IEEE | Institute of Electrical and Electronics Engineers |
| ISA | Instruction Set Architecture |
| Opcode | Operation Code |
| RISC | Reduced Instruction Set Computer |
| SoC | System on a Chip |
| WFE | Wrong Edge and False Edge Misinterpretations |

An important aspect of designing a computer processor is testing the design thoroughly, in order to assure that the design complies with desired architectural specifications. This can be achieved either by a formal proof or by exhaustive simulation. However, state of the art formal techniques and the complexity of processors render the formal approach unfeasible for large industrial applications. Moreover, exhaustive simulation is impossible, as the test space is enormous. In practice, design verification is carried out by simulating a relatively small subset of selected test programs. These are run through a design simulation model, and the results are compared with the output predicted by an architecture simulation model.

Test program generators are basically sophisticated software engines, which are used to create numerous test cases to be executed by the processor implementation under test. By appropriate configuration, it is possible for test generation to be focused on very specific ranges of conditions, or broadened to cover a wide range of logic. Today, large numbers of test cases can be created automatically in the time that a single test case could be written manually, as was done prior to the advent of test case generators.

An example of a conventional test program generator is the IBM tool, Genesys, which is disclosed in the document *Model-Based Test Generation for Process Design Verification*, Y. Lichtenstein et al., Sixth Innovative Applications of Artificial Intelligence Conference, August 1994, pp. 83-94. An updated version, of Genesys, known as Genesys-Pro, is a generic random test generator, targeted at the architectural level and applicable to any architecture.

The importance of validating architecture compliance has increased in recent years, as complex hardware designs have shifted from custom ASICs toward SoC designs, which include ready-made components ("cores"). One of the immediate outcomes of this trend is a very strong drive towards standardization at all levels. In this context, there is a growing tendency to use well-established and recognized processor architectures.

Consequently, many companies that build processor-based SoCs nowadays choose to design a microprocessor that implements an existing and proven architecture that is commercially available. These companies, along with the architecture owner, obviously have a strong incentive to ensure that the design complies with its specification. In short, the need for compliance validation has increased.

SUMMARY OF THE INVENTION

An embodiment of the invention provides a method for automatically creating compliance test suites for a processor, wherein the processor architecture permits selection among multiple options for implementations, and the implementations each exhibit a respective alternative behavior corresponding to selected combinations of the options. The method is carried out by constructing a generic model set for the implementations. The generic model set includes several parametric models and is adapted to a model-based test generator. Based on the generic model set, the method includes establishing specific model sets to correspond to the respective alternative behavior of the implementations by setting respective values of parameters for the parametric models. The method is further carried out by producing test specifications using the parametric models, submitting the test specifications to the test generator, and generating respective architectural compliance test suites for the implementations with the test generator using the test specifications, wherein the test generator is cooperative with the parametric models to predict expected outcomes during execution of the respective architectural compliance test suites by the implementations.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
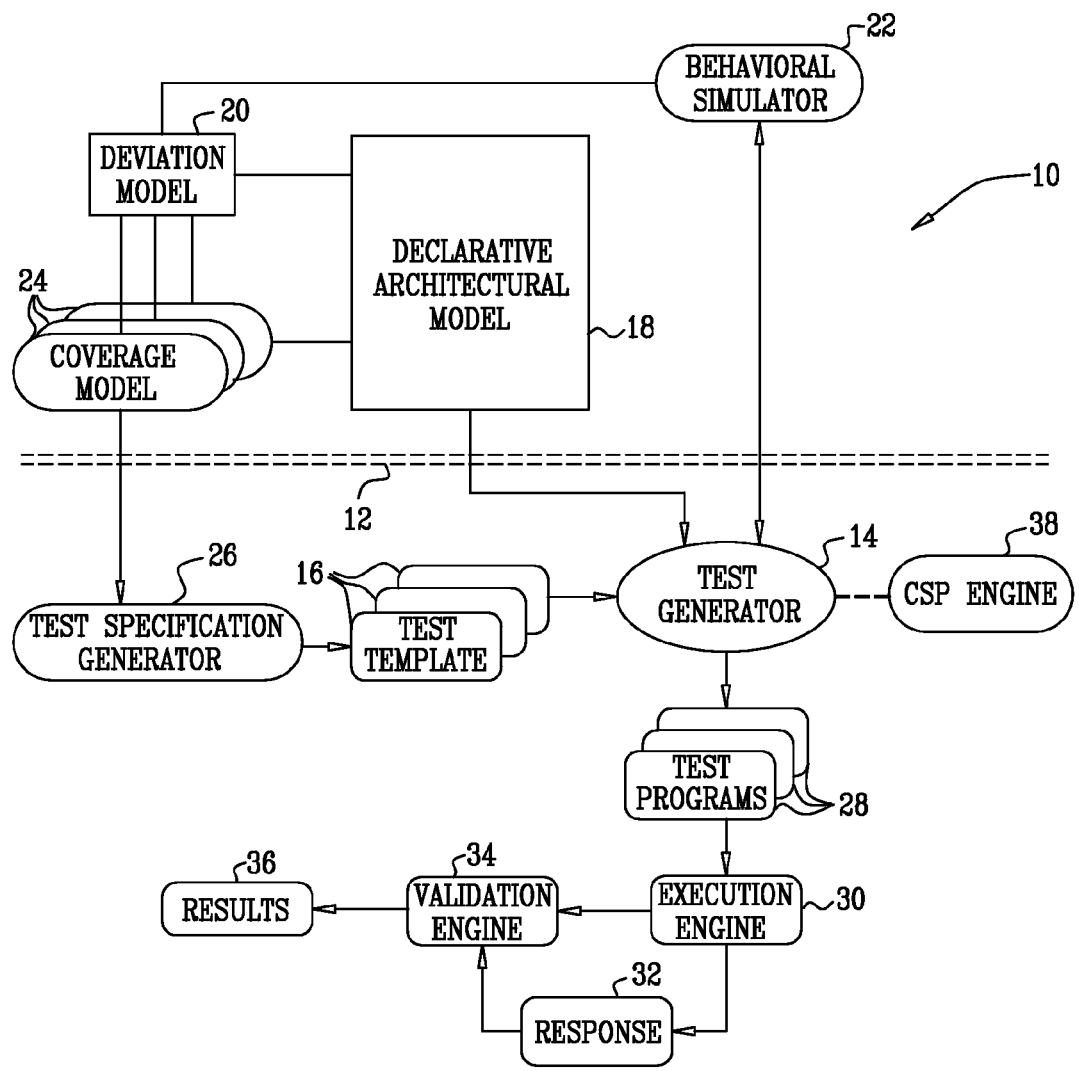
FIG. 1 is a block diagram of a system for automatically generating architectural compliance test suites that is constructed and operable in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

Overview.

An illustrative aspect of an architectural compliance test suite according to the present invention concerns an instruction set, or instruction set architecture (ISA). The instruction set architecture of a processor architecture describes the aspects of a computer architecture visible to a programmer, including native data types, instructions, registers, addressing modes, memory architecture, interrupts and exception handling, and any external I/O. An instruction set architecture includes a specification of the set of codes (opcodes) that are the native form of commands implemented by a particular processor design. The set of opcodes for a particular instruction set architecture is also known as the machine language for the instruction set architecture.

The term "instruction set architecture" is sometimes used to distinguish this set of characteristics from the processor's microarchitecture, which is the set of processor design techniques used to implement the instruction set (including microcode, pipelining, cache systems, and so forth). Computers with different microarchitectures can share a common instruction set. For example, the Intel® Pentium® and the AMD Athlon™ implement nearly identical versions of the x86 instruction set, but have radically different internal designs.

An instruction set architecture presents a consistent view to the programmer, which is independent of design details. Thus, there is a strong technological and business incentive to assure that a new implementation is fully compliant with the instruction set architecture. As indicated above, the developer, owner, and implementer of an architecture may all be different entities, and each may be unaware of proprietary aspects of the activities of the others. Yet, all have a common interest in assuring that a commercial product that incorporates the architecture is compliant with the specification. Furthermore, the architecture may evolve in successive versions. The common incentive is enhanced by the further consideration that the evolved design should accommodate applications written for previous versions.

There are several challenges and pitfalls in the development of such an architecture validation suite. In general, it is difficult to fathom what the scope of such a suite should be, and how it can be derived to meet its various requirements. The nature of these challenges stems from several sources: the complexity of the architecture, the score of undefined or optional behaviors, and the flexibility to cope with changes in the architecture, to cite the more significant ones.

Another issue is the need for compliance of the design with external standards in order to enable the design to be used in specific environments. Thus, it may be required that specific sections of the instruction set architecture follow some popular standard (e.g., the IEEE floating-point operations standard) or that the entire instruction set architecture is compatible with other architectures. At the interface level, a processor may be required to adhere to specified standards related to its memory model, such as cache, bus and I/O protocols.

In the past, a large architecture validation suite of test cases was typically built to cover every aspect of a given architecture, and then used in the compliance validation process. Today, numerous test suites are commercially available, notably for the x86 and the advanced RISC machine (ARM) architectures. Such test suites are typically of huge dimensions, but do not provide a clear quality guarantee. Their main attraction lies in the fact that they have already been used in several design processes. However, their lack of defined coverage measurement renders them of little benefit as a compliance measure. These test suites merely constitute a threshold to be passed, but they give little assurance regarding the degree of conformance of the tested design.

When validating variants having different deviations, it was necessary to modify the test suite. This was tedious, labor intensive, and error prone. For example, implementation of some instructions might be optional in the specification of the processor architecture. When the designer chose to implement such instructions, a certain behavior would be expected. When not implemented, an attempt to execute the instructions might raise an exception. It would then be necessary to maintain two versions of the architecture validation suite in order to determine whether the appropriate behavior occurred in both cases.

More generally, the processor architecture permits selection among many options for realization of many of its aspects, of which result in alternative, implementation dependent behaviors, according to the options selected by the implementer. A conventional approach based on a static test suite would require maintaining many test suites: one test suite for each parameter combination.

The development of an architecture validation suite for an instruction set architecture and other aspects of a processor is a complex process with numerous challenges. The first category of challenges is related to the sheer size of the architecture specification, which includes an extremely large number of different behaviors and rules. The initial difficulty is to come up with a comprehensive list of coverage goals whose fulfillment indeed exercises all these behaviors and rules. The inherent intricacy of deriving such a list is aggravated by the fact that architectures typically allow several optional outcomes or even leave some behaviors completely undefined.

For example, the processor architectural specification might leave as a design decision whether a given unaligned memory access will succeed or cause an exception leading to an interrupt. It might even define some of the most basic constructs, such as opcodes, as optional. Such a suite is also not bound to cover only opcode behaviors. Furthermore, there are more complex aspects of the architecture that must also be addressed. Indeed, some behaviors are left undefined.

Some rules might be set regarding instruction ordering for a given processor, others might regulate accesses to shared memory by different processors, while yet others might describe hardware facilities to handle address translation. These examples show that the scope of a compliance test suite must be extended beyond the mere coverage of opcode behavior. The complexity of such a suite includes, among other things, the need for tests including sequences of instructions and tests in multi-processor configurations.

In different commercial versions, it is to be anticipated that implementers of a processor architecture may decide to follow different implementation paths among several enumerated possibilities in the specification of the processor architecture. These choices should not affect the software compatibility aspect of the designs. Nevertheless, different implementations are expected to exhibit alternative behaviors under compliance test conditions, depending on which legal choices were selected. Such behaviors are sometimes referred to herein as "deviations".

According to disclosed embodiments of the invention, a model-based test case generation technology is provided to automatically generate respective architectural compliance test suites for different implementations of a processor architecture, according to the set of legal options chosen for each implementation.

A model-based test case generator is a generic engine, which, given an abstract declarative description of a processor design, can generate various test cases according to test specification provided by a user. It can predict expected results, that is, the expected state of a processor design at the end of the test case execution. At the heart of the approach according to the invention, the modeling capabilities of the test case generator are extended and harnessed to create a parametric definition of the specific architecture choices performed by a given design by constructing a generic model set for a plurality of implementations of the processor architecture. The generic model set comprises several parametric models that are adapted to the model-based test generator, and includes a parametric declarative model of the architecture, which is discussed in further detail below.

In one aspect of the invention, the behavior of the architecture, which is included in the aforementioned parametric generic model set, is captured as a behavioral model. The use of behavioral models in model-based test generators is well known.

In some embodiments, a list of possible architecture misinterpretations, including missing behavior, wrong understanding of a behavior, or confusion with other behaviors described in the architecture or elsewhere, is automatically derived. These misinterpretations constitute the backbone of coverage models, which are included in the parametric generic model set. The coverage models direct the creation of the architectural compliance test suite. To this end, a set of test specifications is automatically derived from these models, and they are in turn fed into the model-based test case generator to generate the final architectural compliance test suite.

Additional advantages of aspects of the invention include reduced maintenance costs, and robustness with respect To accommodating changes in the instruction set architecture.
Compliance Validation vs. Verification.

Validating the compliance of a given processor design to its architecture is the process of showing that the architecture specification has been well understood by the designer, and that the design behavior reflects this specification point by point. There is often confusion between compliance validation and verification. Verification refers to the entire process of uncovering flaws (bugs) in a design, with the ultimate goal of delivering it to the market as bug-free as possible, while the scope of compliance validation is limited to ensuring that the architecture has been correctly interpreted during the implementation. Compliance validation does not concern itself with implementation details, and in fact, should be similar for a whole family of designs stemming from the same architecture.

The development of a processor architecture design can be viewed conceptually as comprising three stages:
 (1) development of a specification;
 (2) activities leading to the design of an embodiment of the standard or specification; and
 (3) implementation of the design.

Noncompliance with the standard typically creeps into this scheme between stages (1) and (2), although it also can occur between stages (2) and (3).

In general, an implementation is not compliant with its specification, if for some inputs, the results calculated by the implementation differs from those defined by the specification. However, in some cases an implementation is not compliant with the specification even when the calculated results do agree with those defined by the specification. Thus, the types of errors that should be targeted in an architectural compliance test suite are different from the types of errors caused by a bad implementation of a well-understood specification.

Although finite, the specification describes how the processor must behave in a potentially infinite number of scenarios. To be confident in the correctness of an implementation, one must either simulate enough test cases until a sufficient level of coverage is reached. Alternatively, one could formally prove the correctness of all the scenarios. As noted above, this proof cannot feasibly be accomplished for an entire processor, even if we assume the specification was correctly understood.

To check against misinterpretations however, it suffices to ensure that each of the finite number of requirements made in the specification was understood correctly.
System Configuration.

Turning now to the drawings, reference is made to FIG. 1, which is a block diagram of a system 10 for automatically generating architectural compliance test suites that is constructed and operable in accordance with a disclosed embodiment of the invention. The teachings of the present invention are not restricted to systems that are configured like the system 10, but are applicable to many testing systems that have different architectures than the system 10. Typically, a processor architecture is verified using a suite of test cases that are generated by the system. As will be become apparent from the following description, the system 10 is adapted to accommodate deviations, and to distinguish between legal variations of the architecture and incongruous divergence from it. The system 10 operates semi-automatically to generate a test suite, which, when executed successfully, ensures that a finite (but large) set of specification requirements have been correctly understood by the implementer.

The system 10 typically comprises a general purpose or embedded computer processor, which is programmed with suitable software for carrying out the functions described hereinbelow. Thus, although the system 10 is shown in FIG. 1 as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be provided to the processor or processors in electronic form, for example, over a network, or it may be furnished on tangible media, such as CD-ROM or nonvolatile memory. Alternatively or additionally, the system 10 may comprise a digital signal processor or hard-wired logic.

The system 10 has several basic interacting components. Those components that are located above a broken line 12 are dependent on the specification of the design-under-test, while those located below the line 12 are independent of the specification.

The system 10 enables the creation of tests that have various degrees of randomness. A generic test program generator engine 14 has a user input, which influences the algorithms used to generate test cases. The test program generator engine 14 introduces random values in many aspects of the test cases, using known techniques for the generation of pseudorandom numbers. Thus, system 10 can generate different compliance test suite for a specific implementation by using different random seeds. The user input comprises a plurality of test templates 16, which are discussed in further detail below.

A declarative architectural model 18 holds a formal description or specification of the processor architecture. This specification may be stored in a database, which may optionally incorporate other testing knowledge of the system design, and may include testing constraints. There are several known ways in which the declarative architectural model 18 can be realized. For example, the declarative architectural model 18 can be written in an architecture description language.

A deviation model 20 influences the declarative architectural model 18, the behavior model 22, and any number of coverage models 24. The deviation model 20 represents alternative allowed behaviors. The simplest realization of the deviation model 20 is a form, which merely indicates the choices made by the designer in each case, for example by flagging one of a plurality of available options. The declarative architectural model 18 can include all the possible deviations in a "conditional" state and then enable only those deviations actually indicated by the deviation model.

The coverage models 24 hold coverage criteria for test suites to be generated. The term "coverage" concerns checking and showing that testing has been thorough. In general, a coverage model is a representation of different states that the processor may undergo, e.g., instructions, state sequences, transitions. The coverage models 24 each comprise a set of related compliance validation tasks represented in a concise manner. In some embodiments, the coverage models 24 can take the form of a flowchart coverage model. Alternatively, the coverage models 24 can be cross-product coverage models. Cross-product coverage models are well known. The use of compliance coverage models, including flowchart coverage models, is disclosed in further detail in application Ser. No. 11/672,050, entitled "Systematic Compliance Checking of a Process", Filed Feb. 7, 2007 (now U.S. Pat. No. 7,673,261), which is herein incorporated by reference. The coverage models 24 are then used by a test specification generator 26 that converts them into test templates 16. The test templates 16 are test specifications, which, when developed using different sets of parameters in the coverage models 24, the deviation model 20, and the declarative architectural model 18, are templates for different implementations of the processor architecture. Thus, whenever an actual test suite is required, the test program generator engine 14 is run with a selected set of the test templates 16, produced using appropriate parameters. Keeping sets of coverage models that can, at any time, be automatically converted into a set of tests is a great improvement in maintainability and flexibility beyond the more prevalent methodology of maintaining sets of tests.

A behavioral model, shown in FIG. 1 as behavioral simulator 22, is used to predict the results of state transitions, such as instruction execution, in accordance with the architectural specification. The use of behavioral simulators in model based test generators is well known.

The behavioral simulator 22 is parametrically controlled. Each flagged entry from the deviation model 20 influences the behavior of the behavioral simulator 22. For example, when the processor specification defines an optional instruction, the deviation model 20 includes a corresponding option. When generating a test that includes this instruction, the behavioral simulator 22 either simulates an interrupt or simulates the instruction, according to whether the option was flagged or not flagged in the deviation model 20.

In the system 10, the declarative architectural model 18, behavioral simulator 22, and coverage models 24 are all parametrically controlled. Thus, different implementations of the same architecture can be easily supported by modifying the parameter values. In addition, ongoing changes to the architecture or comprehensive updates to the test suite can be handled by updating the architecture model or sometimes even the coverage models, forgoing the need to review the whole, potentially huge, set of tests. The potentially huge set of test suites can then be automatically regenerated by the test program generator engine 14, without need to adjust it manually. Furthermore, as described in further detail below, the coverage models 24 are able to precisely represent and document targeted errors far better than a specific test can.

Alternatively, the declarative architectural model 18, behavioral simulator 22, and coverage models 24 may be realized as "plug-in" modules for the test program generator engine 14, all customized for a particular implementation. They can be exchanged when it is necessary to generate or regenerate an architectural compliance test suite for that implementation.

Test programs 28 generated by the test program generator engine 14 are executed by an execution engine 30 on an implementation of the processor. The execution engine 30 can be a simulator of the processor implementation, or an actual processor.

Execution of the test programs 28 stimulates the design-under-test, and produces a response 32. The response 32 is typically submitted to an evaluation process, represented in FIG. 1 as a compliance validation engine 34. Unlike conventional validation engines, which look at test outcomes and compare them with expected results, in some embodiments, the validation engine 34 may be adapted to evaluate the flow of the processor states, e.g., particular steps taken as a result of the stimulation, and the order of the steps. In such embodiments, the flow is deduced from the response 32. In any case, results are reported as compliance validation results 36.

In some embodiments, at least a portion of the test programs 28 that are produced by the test program generator engine 14 are solutions of constraint satisfaction problems (CSPs), which are formulated and solved using a CSP engine 38. In general, constraint solution in test generation involves identifying conditions that are important to test and then solving for input values that lead to these conditions. Many known CSP engines can be used as the CSP engine 38.

Data Flow.

As pointed out previously, the architecture often defines a set of allowed behaviors, only one of which will actually be implemented by any particular design. Selections of allowed deviations can be modeled as the deviation model 20. The simplest modeling method is a form, which merely indicates the choice made by the designer in each case. The declarative architectural model 18 can include all the possible deviations in a "conditional" state and then enable only those deviations actually indicated by the deviation model. Deviation-dependent aspects of the coverage models may also refer to this deviation model so that the suite of coverage models for every new design need not be updated.

Figure 2:
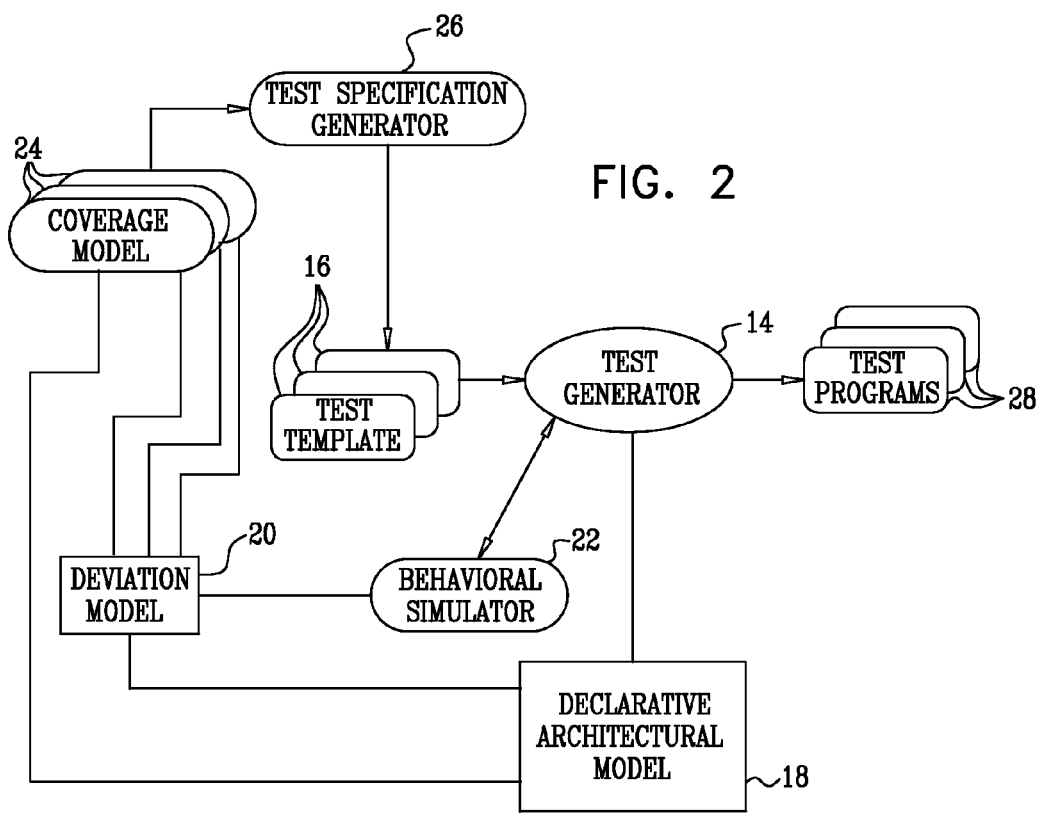
FIG. 2 is a diagram illustrating information flow among the components of the system shown in FIG. 1, leading to generation of an architectural compliance test suite in accordance with a disclosed embodiment of the invention.

Reference is now made to FIG. 2, which is a diagram illustrating information flow among the components of the system 10 (FIG. 1) leading to generation of an architectural compliance test suite in accordance with a disclosed embodiment of the invention. The test specification generator 26 receives input from the coverage models 24, which in turn are influenced by the declarative architectural model 18 and the deviation model 20. The test specification generator 26 generates a set of test templates 16, according to which set of the coverage models 24 is currently active. The test templates 16 are fed into the test program generator engine 14, each of the test templates 16 generally being used to generate one of the test programs 28. As noted above, the behavioral simulator 22 is used by the test program generator engine 14 to predict expected results for each of the test programs 28.

As mentioned above, the system 10 adapts the generated test suite to a specific implementation according to the architectural decisions made for it. The user of the system 10 inputs a set of implementation choices. Typically, this is a limited set of predefined questions derived from the available options in the specification of the processor architecture. Responses to these questions are recorded in the deviation model 20, and reflected in adjustments to the parameters of the declarative architectural model 18, the behavioral simulator 22, and the coverage models 24. Three processes are then automatically executed, typically in parallel:

(1) An implementation-specific version of the test program generator engine 14 is instantiated using the new parameters of the declarative architectural model 18.

(2) An implementation-specific version of the behavioral simulator 22 is instantiated using the new parameters of the declarative architectural model 18.

(3) An implementation-specific set of coverage models 24 is instantiated using the new parameters of the declarative architectural model 18.

Test Template Generation.

Referring again to FIG. 1, the test templates 16 are generated to comply with input requirements of the test program generator engine 14, and to influence the test program generator engine 14 to generate an appropriate version of the test programs 28 architecture compliance suite.

Parameterization.

As discussed previously, the coverage models 24, declarative architectural model 18, and the behavioral simulator 22 are all parametrically controlled by the parameters in the deviation model 20.

To illustrate the functionality of the deviation model 20, the following two examples of the use of deviation flags illustrate the influence of the deviation model 20 on the coverage models 24, declarative architectural model 18, and the behavioral simulator 22.

Optional Instruction.

Consider a case of an optional instruction that is specified in a processor architecture. A corresponding flag is included in the deviation model, which has the value "true" in case the instruction is supported by a particular implementation and the value "false" in case the instruction is not supported by the implementation.

First, assume that the flag's value is true. In such a case, whenever a test includes the optional instruction, the behavioral simulator 22 will simulate its execution and will generate the result according to the instruction's specification in the architecture. The appropriate coverage models 24 will include cases that cover the behavior of the instruction. The declarative architectural model 18 will show the instruction as being supported.

On the other hand, if the flag's value is false, the behavioral simulator 22 will simulate an interrupt when executing this instruction. The coverage models 24 will not include cases to check the behavior of the instruction, but will instead include a model to validate that execution of the instruction indeed causes an interrupt. The declarative architectural model 18 will show the instruction as not being supported.

Address Space.

In the second example, assume that the processor architecture permits each implementation to define its address space. Therefore, the deviation model 20 has an address space option, in which a specific range is entered for each implementation. In this respect, the coverage models 24 are the same for any implementation, but their effects in the test programs may vary in different implementations. The behavioral simulator 22 checks address values to decide if an address accessed is within the range of validity for the current implementation. If not, then an interrupt is generated. Finally, the declarative architectural model 18 updates its version of the valid address space to be used by the test generator in accordance with the deviation model 20.

Test Generation.

After having defined an entire set of compliance coverage models, test are generated to cover the models. Referring again to FIG. 2, the test program generator engine 14 receives test specifications provided by the test specification generator 26, based on the appropriate selections of the coverage models 24.

Example 1

In this general example, a compliance validation system based on the principles described herein this paper was used in two industrial compliance validation projects for two separate developments of the PowerPC processor. Both were checked for compliance using radically different variations of the PowerPC architecture.

The core architecture was modeled. The flowchart and cross product models were developed over several months. Once the basic PowerPC framework was in place, it took only a short additional time to adjust it to different processor implementations.

The compliance suite targeted five major areas: the instruction set (approximately 650 instructions organized in about 15 major functional groups); interrupts; address translation; the memory model; and undefined and illegal behaviors. The total number of coverage models created was 190 and the total numbers of generated tests was slightly above 38,000. Table 2 gives the number of flowchart and cross-product models needed to cover the different aspects of the architecture and the number of tests generated for these models. As shown, the flowcharts required to cover the PowerPC architecture are not very numerous but they are used to define a much larger set of tests. In addition, each flowchart is relatively compact and simple.

TABLE 2

| PowerPC Compliance Models | | | |
|---|---|---|---|
| | Models | | # of |
| | FC | CP | Tests |
| ISA | 136 | | 6342 |
| Interrupts | 13 | | 220 |
| Translation | 3 | 15 | 407 |
| Illegal behavior | 2 | 1 | 26246 |
| Memory model | | 20 | 4800 |

During the compliance validation processes, almost 20 cases of architecture misinterpretation were uncovered (beyond purely design bugs that were also incidentally found). Some of these compliance bugs were recognized as resulting from flaws in the text of the architectural specification, which was corrected accordingly. The bugs that were found included omission of a special purpose register, which was incorrectly deemed to be optional; the implementation of two mutually exclusive optional facilities; and an interrupt that was omitted.

Example 2

This example illustrates the importance of the deviation model. The deviation model of the PowerPC server compliance suite system has more than sixty different options, which are categorized as shown in Table 3:

TABLE 3

PowerPC Options

| Description | Number of options |
| --- | --- |
| Optional facility | 7 |
| Optional instruction or group of instructions | 14 |
| Cache related options | 6 |
| Memory system options | 15 |
| Translation options | 11 |
| Special purpose register options | 3 |
| Interrupt options | 6 |
| Others | 2 |

Generating a test suite for a new implementation of the architecture using a conventional static test suite approach would require very complex manual changes to an existing suite. This may be impractical in a case where many of the decisions for the new implementation are different than those made for the original test suite. Using the principles described in this invention, a new implementation is supported by simply updating the values according to options presented in the Table 3 in the deviation model. Using an updated deviation model, the new test-suite is generated automatically.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for automatically creating compliance test suites for a processor, comprising the steps of:
constructing a generic model set for a plurality of implementations of a processor architecture, said generic model set comprising one or more parametric models and being adapted to a model-based test generator, wherein said processor architecture specifies selectable options which, when selected, produce respective alternative behaviors of said implementations;
establishing a deviation model that indicates a selection of at least one of the options, wherein said deviation model comprises a set of deviation parameters that are reflective of said one option, and wherein said parametric models are responsive to said deviation parameters of said deviation model so as to enable respective alternative behaviors of the implementations that embody the one option;
based on said generic model set, establishing specific coverage model sets to correspond to said respective alternative behaviors of said implementations;
responsively to said deviation model, modifying said generic model set and said coverage model sets by setting respective values of parameters for said parametric models and said coverage model sets;
producing test specifications using said parametric models and said coverage model sets;
submitting said test specifications to said test generator; and
generating respective architectural compliance test suites for said implementations with said test generator using said test specifications, wherein said test generator is cooperative with said parametric models using said values to predict expected outcomes in an execution of said respective architectural compliance test suites by a simulator of said implementations.

2. The method according to claim 1, further comprising the steps of executing at least one of said respective architectural compliance test suites and reporting an indication of a compliance error.

3. The method according to claim 1, wherein said generic model set comprises:
a declarative model comprising a formal description of said processor architecture
a coverage model that represents an extent to which different states of the processor are traversed during testing of said implementations; and
a behavioral model for predicting said expected outcomes of instruction execution by said implementations,
the method further comprising the steps of parametrically controlling said declarative model, said coverage model and said behavioral model responsively to said deviation parameters of said deviation model.

4. The method according to claim 3, wherein said coverage model comprises a flowchart coverage model.

5. The method according to claim 3, wherein said coverage model comprises a cross product coverage model.

6. The method according to claim 1, wherein in said step of generating respective architectural compliance test suites said test generator is operative to introduce random values in said compliance test suites.

7. The method according to claim 1, wherein said respective alternative behaviors comprises at least one of defining an implementation-specific address space, and supporting an optional instruction.

8. The method according to claim 1, further comprising providing a behavioral simulator that is responsive to a deviation flag in the deviation model that indicates an enablement of an optional processor instruction, wherein the behavioral simulator generates a result when the flag has a first setting and generates an interrupt when the flag has a second setting.

9. The method according to claim 1, wherein the deviation model comprises an address space parameter that defines a respective range of validity for the implementations of the processor architecture, the method further comprising providing a behavioral simulator that is operative to evaluate an address value of a processor instruction, and, responsively to the address space parameter of the deviation model, generates an interrupt when the address value is not within the range of validity.

10. A computer software product for automatically creating compliance test suites for a processor, the product including a non-transitory tangible computer-readable medium in which computer program instructions are stored, which instructions, when read by a computer, cause the computer to:
instantiate objects in a memory of the computer comprising:
a model-based test generator; and
a generic model set for a plurality of implementations of a processor architecture, said generic model set comprising one or more parametric models and being adapted to said model-based test generator, wherein said processor architecture specifies selectable options which, when selected, produce respective alternative behaviors of said implementations;
wherein said computer is further instructed to:
establish a deviation model that indicates a selection of at least one of the options, wherein said deviation model comprises a set of deviation parameters that are reflective of said one option, and wherein said parametric models are responsive to said deviation parameters of said deviation model so as to enable respective alternative behaviors of the implementations that embody the one option;

based on said generic model set, establish specific coverage model sets to correspond to said respective alternative behaviors of said implementations;

responsively to said deviation model, modifying said generic model set and said coverage model sets by setting respective values of parameters for said parametric models and said coverage model sets;

produce test specifications using said parametric models and said coverage model sets;

submit said test specifications to said test generator; and generate respective architectural compliance test suites for said implementations with said test generator using said test specifications, wherein said test generator is cooperative with said parametric models using said values to predict expected outcomes in an execution of said respective architectural compliance test suites by a simulator of said implementations.

11. The computer software product according to claim 10, wherein said computer is further instructed to execute at least one of said respective architectural compliance test suites and report an indication of a compliance error.

12. The computer software product according to claim 10, wherein said generic model set comprises:
a declarative model comprising a formal description of said processor architecture
a coverage model that represents an extent to which different states of the processor are traversed during testing of said implementations; and
a behavioral model for predicting said expected outcomes of instruction execution by said implementations,
wherein said computer is further instructed to parametrically control said declarative model, said coverage model and said behavioral model responsively to said deviation parameters of said deviation model.

13. The computer software product according to claim 12, wherein said coverage model comprises a flowchart coverage model.

14. The computer software product according to claim 12, wherein said coverage model comprises a cross product coverage model.

15. The computer software product according to claim 10, wherein said test generator is operative to introduce random values in said compliance test suites.

16. The computer software product according to claim 10, wherein said respective alternative behaviors comprises at least one of defining an implementation-specific address space, and supporting an optional instruction.

17. An apparatus for automatically creating architectural compliance test suites for a processor, comprising:
a computer processor; and
a memory accessible by said computer processor and having objects instantiated therein, said objects comprising:
a model-based test generator;
a generic model set for a plurality of implementations of a processor architecture, said generic model set comprising one or more parametric models and being adapted to said model-based test generator, wherein said processor architecture specifies selectable options which, when selected, produce respective alternative behaviors of said implementations;

wherein said processor is operative to:

establish a deviation model that indicates a selection of at least one of the options, wherein said deviation model comprises a set of deviation parameters that are reflective of said one option, and wherein said parametric models are responsive to said deviation parameters of said deviation model so as to enable respective alternative behaviors of the implementations that embody the one option;

based on said generic model set, establish specific coverage model sets to correspond to said respective alternative behaviors of said implementations;

responsively to said deviation model, modifying said generic model set and said coverage model sets by setting respective values of parameters for said parametric models and said coverage model sets;

produce test specifications using said parametric models and said coverage model sets;

submit said test specifications to said test generator; and generate respective architectural compliance test suites for said implementations with said test generator using said test specifications, wherein said test generator is cooperative with said parametric models using said values to predict expected outcomes in an execution of said respective architectural compliance test suites by a simulator of said implementations.

18. The apparatus according to claim 17, wherein said generic model set comprises:
a declarative model comprising a formal description of said processor architecture
a coverage model that represents an extent to which different states of the processor are traversed during testing of said implementations; and
a behavioral model for predicting said expected outcomes of instruction execution by said implementations,
wherein said computer processor is operative to parametrically control said declarative model, said coverage model and said behavioral model responsively to said deviation parameters of said deviation model.

19. The apparatus according to claim 18, wherein said coverage model comprises a flowchart coverage model.

20. The apparatus according to claim 18, wherein said coverage model comprises a cross product coverage model.

21. The apparatus according to claim 17, wherein said test generator is operative to introduce random values in said compliance test suites.

22. The apparatus according to claim 17, wherein said computer processor is operative to execute at least one of said respective architectural compliance test suites and report an indication of a compliance error.

23. The apparatus according to claim 17, wherein said respective alternative behaviors comprises at least one of defining an implementation-specific address space, and supporting an optional instruction.

* * * * *